(12) United States Patent
Besanson Tuma et al.

(10) Patent No.: US 11,416,920 B2
(45) Date of Patent: Aug. 16, 2022

(54) ANALYTICS ENGINE FOR MULTIPLE BLOCKCHAIN NODES

(71) Applicant: Accenture Global Solutions Limited, Dublin (IE)

(72) Inventors: Carlos Gaston Besanson Tuma, Barcelona (ES); Robert Gimeno Feu, Barcelona (ES); Jaime Rodriguez Lagunas, Barcelona (ES)

(73) Assignee: Accenture Global Solutions Limited, Dublin (IE)

( * ) Notice: Subject to any disclaimer, the term of this patent is extended or adjusted under 35 U.S.C. 154(b) by 192 days.

(21) Appl. No.: 16/189,436

(22) Filed: Nov. 13, 2018

(65) Prior Publication Data

US 2019/0188787 A1   Jun. 20, 2019

(30) Foreign Application Priority Data

Dec. 20, 2017   (EP) .................................... 17380030

(51) Int. Cl.
*G06Q 30/08* (2012.01)
*H04L 9/06* (2006.01)
(Continued)

(52) U.S. Cl.
CPC ........... *G06Q 30/08* (2013.01); *G06F 16/215* (2019.01); *G06Q 40/02* (2013.01); *H04L 9/0637* (2013.01); *H04L 9/008* (2013.01); *H04L 2209/38* (2013.01)

(58) Field of Classification Search
CPC ........ G06Q 30/08; G06Q 40/04; G06Q 40/02; G06F 16/215; H04L 9/0637; H04L 9/0618; H04L 9/008; H04L 2209/38
See application file for complete search history.

(56) References Cited

U.S. PATENT DOCUMENTS

| 10,135,607 B1* | 11/2018 | Roets ..................... H04L 9/3213 |
| 2016/0123620 A1* | 5/2016 | Orsini ....................... G06F 1/20 |
| | | 700/276 |

(Continued)

FOREIGN PATENT DOCUMENTS

WO   2017134281 A1   8/2017

OTHER PUBLICATIONS

E. Karafiloski and A. Mishev, "Blockchain solutions for big data challenges: A literature review," 2017, IEEE Eurocon 2017—17th International Conference on Smart Technologies, pp. 763-768, (Year: 2017).*

(Continued)

*Primary Examiner* — Sarah M Monfeldt
*Assistant Examiner* — Michael J. Monaghan
(74) *Attorney, Agent, or Firm* — Harrity & Harrity, LLP

(57) ABSTRACT

A first device receives, via a blockchain node of the first device, data and constraints associated with a smart contract, where the smart contract is deployed via a blockchain node associated with a second device, the first and second devices are provided in a blockchain network, through their blockchain nodes. The first device provides, via the blockchain node, the data and constraints to an analytics engine of the first device, and performs, via the analytics engine, a data analytics technique on the data and constraints to generate an offer with optimized parameters. The first device provides the offer with the optimized parameters to the smart contract associated with the second device, and receives, via the blockchain node, a confirmation of a transaction associated with the smart contract. The first device causes the offer with the optimized parameters to be implemented based on receiving the confirmation of the transaction.

20 Claims, 10 Drawing Sheets

(51) Int. Cl.
*G06F 16/215* (2019.01)
*H04L 9/00* (2022.01)
*G06Q 40/02* (2012.01)

(56) References Cited

U.S. PATENT DOCUMENTS

| | | | | |
|---|---|---|---|---|
| 2017/0011460 | A1* | 1/2017 | Molinari | G06F 21/645 |
| 2017/0103468 | A1* | 4/2017 | Orsini | G06Q 40/12 |
| 2017/0140408 | A1* | 5/2017 | Wuehler | G06Q 30/0207 |
| 2017/0230189 | A1* | 8/2017 | Toll | H04L 9/3247 |
| 2017/0287090 | A1* | 10/2017 | Hunn | G06Q 50/18 |
| 2018/0005186 | A1* | 1/2018 | Hunn | G06F 40/103 |
| 2018/0018590 | A1* | 1/2018 | Szeto | G06N 20/10 |
| 2018/0069899 | A1* | 3/2018 | Lang | G06F 8/38 |
| 2018/0165612 | A1* | 6/2018 | Saxena | G06N 20/00 |
| 2018/0227116 | A1* | 8/2018 | Chapman | G06F 9/451 |
| 2018/0268151 | A1* | 9/2018 | Cuomo | G06F 21/645 |
| 2018/0315141 | A1* | 11/2018 | Hunn | G06F 40/42 |
| 2019/0013948 | A1* | 1/2019 | Mercuri | H04L 9/0643 |
| 2020/0097329 | A1* | 3/2020 | Zhou | G06F 9/5011 |
| 2020/0322132 | A1* | 10/2020 | Covaci | H04L 9/3247 |
| 2021/0075600 | A1* | 3/2021 | Trevethan | G06Q 20/065 |

OTHER PUBLICATIONS

C. Xu, K. Wang and M. Guo, "Intelligent Resource Management in Blockchain-Based Cloud Datacenters," Nov./Dec. 2017, IEEE Cloud Computing, vol. 4, No. 6, pp. 50-59, (Year: 2017).*
Extended European Search Report for Application No. EP17380030.1, dated May 9, 2018, 8 pages.
Antonopoulos., "Mastering Bitcoin," Programming the Open Blockchain, O'Reilly Media, Jul. 21, 2017, XP055570487, ISBN: 978-1-4919-5438-6, Retrieved from the Internet: [URL: https://www.oreilly.com/library/view/mastering-bitcoin-2nd/9781491954379/], [retrieved on Mar. 18, 2019].

* cited by examiner

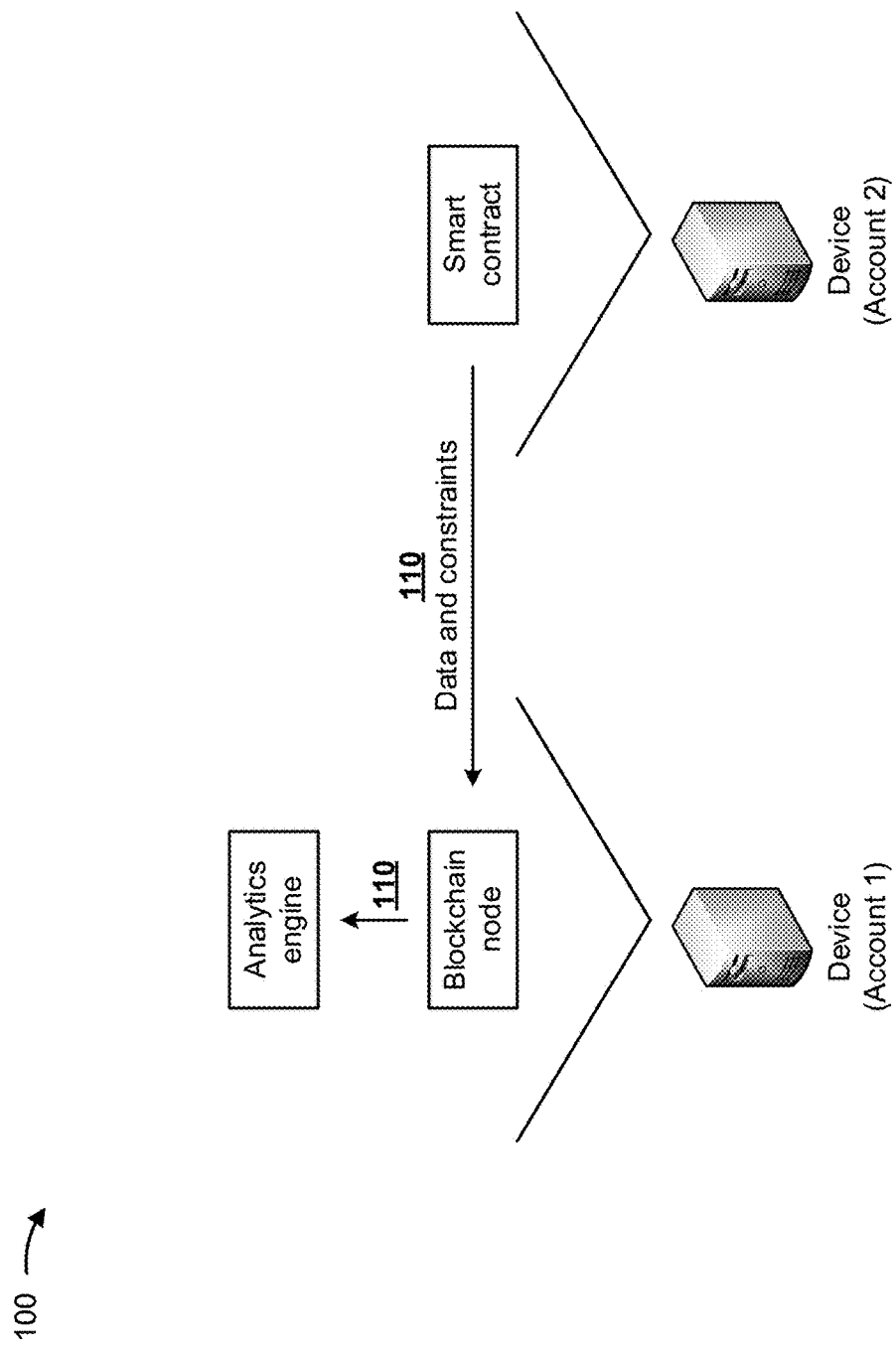

145
Perform optimization

Analytics engine

Variables
Time stamp
Selling price
Offered quantity
Other specifications

Constraints
Quantity < Available capacity
Materials in materials available
Lead time > minimum lead time
Bid price > minimum asked price
Selling price < bid price

Factory parameters
Product = Table
Quantity = 800
Material = Wood
Lead time = 5 days
Bid price = $45

Producer parameters
Available capacity = 1000 /month
Materials available = wood, steel, plastic
Minimum lead time = 3 days
Minimum asked price = $50, $70, $30

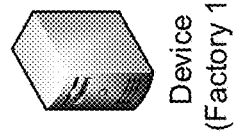
Device
(Factory 1)

FIG. 1E

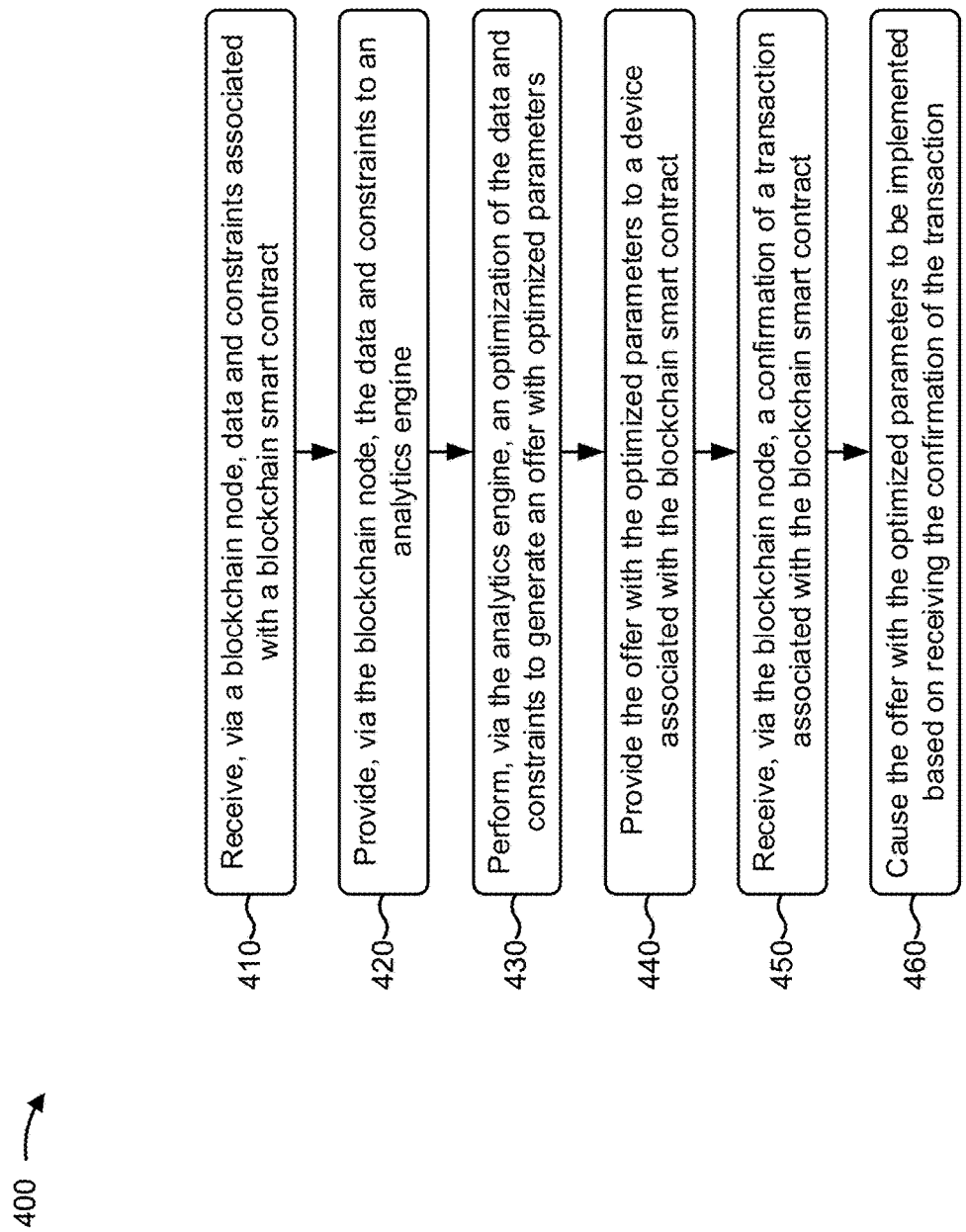

ANALYTICS ENGINE FOR MULTIPLE BLOCKCHAIN NODES

RELATED APPLICATION

This application claims priority under 35 U.S.C. § 119 to European Patent Application No. 17 380 030.1, filed on Dec. 20, 2017, the content of which is incorporated by reference herein in its entirety.

BACKGROUND

A blockchain is a continuously growing list of records, called blocks, which are linked and secured using cryptography. Each block contains a hash pointer as a link to a previous block, a timestamp, and transactional data (e.g., each block may include many transactions). By design, a blockchain is inherently resistant to modification of the transactional data. A blockchain may be managed by a peer-to-peer network of nodes (e.g., devices) collectively adhering to a consensus protocol for validating new blocks. Once recorded, the transaction data in a given block cannot be altered retroactively without the alteration of all previous blocks, which requires collusion of a majority of the network nodes.

A blockchain is an append-only data structure maintained by a network of nodes that do not fully trust each other. All nodes in a blockchain network agree on an ordered set of blocks, and each block may contain multiple transactions. Thus, a blockchain may be viewed as a log of ordered transactions. One particular type of blockchain (e.g., Bitcoin) stores coins as system states shared by all nodes of the network. Bitcoin-based nodes implement a simple replicated state machine model that moves coins from one node address to another node address, where each node may include many addresses. Furthermore, public blockchains may include full nodes, where a full node may include an entire transactional history and be a true keep of a ledger (e.g., a log of transactions), and a node may not include the entire transactional history. For example, Bitcoin includes 5,500 full nodes in all of the nodes that are connected to Bitcoin.

Another particular type of blockchain (e.g., Ethereum) extends Bitcoin to support user-defined and Turing-complete state machines. An Ethereum blockchain lets the user define complex computations in a form of a smart contract. A smart contract is a computer protocol that facilitates, verifies, and/or enforces negotiation or performance of a contract. Once deployed, a smart contract is executed on all Ethereum nodes as a replicated state machine. The Ethereum node includes an execution engine (e.g., an Ethereum virtual machine (EVM)) that executes a smart contract. One difference between Ethereum and Bitcoin is that smart contract and transaction states are maintained by Ethereum, while only transaction states are maintained by Bitcoin. In fact, a smart contract is identified by a unique address that includes a balance. Upon retrieving a trigger transaction to the unique address, the smart contract executes logistics of the smart contract.

SUMMARY

According to some implementations, a first device may include a memory, and one or more processors, operatively coupled to the memory, to receive, via a blockchain node of the first device, data and constraints associated with a smart contract, where the smart contract is associated with a second device that is different than the first device, the first device and the second device are provided in a blockchain network, and the blockchain node is one of multiple blockchain nodes associated with the blockchain network. The one or more processors may provide, via the blockchain node, the data and constraints to an analytics engine of the first device, and may perform, via the analytics engine, a data analytics technique on the data and constraints to generate an offer with optimized parameters. The one or more processors may provide the offer with the optimized parameters to the smart contract associated with the second device, and may receive, via the blockchain node, a confirmation of a transaction associated with the smart contract based on providing the offer with the optimized parameters to the smart contract associated with the second device. The one or more processors may cause the offer with the optimized parameters to be implemented based on receiving the confirmation of the transaction.

According to some implementations, a non-transitory computer-readable medium may store instructions that include one or more instructions that, when executed by one or more processors of a first device, cause the one or more processors to receive, via a first blockchain node of the first device, information associated with a smart contract, where the smart contract is associated with a second device that is different than the first device, the second device includes a second blockchain node, and the first blockchain node and the second blockchain node are part of a blockchain. The one or more instructions may cause the one or more processors to provide, via the first blockchain node, the information to an analytics engine of the first device, and perform, via the analytics engine, a data analytics technique on the information. The one or more instructions may cause the one or more processors to generate an offer based on performing the data analytics technique on the information, and provide the offer to the smart contract associated with the second device. The one or more instructions may cause the one or more processors to receive, via the first blockchain node, an indication of acceptance of the offer based on providing the offer to the smart contract associated with the second device, and cause parameters associated with the offer to be implemented based on receiving the indication of acceptance of the offer.

According to some implementations, a method may include receiving, via a blockchain node of a first device, parameters associated with a smart contract, where the smart contract is associated with a second device that is different than the first device, the first device and the second device are provided in a blockchain network, and the blockchain node is one of multiple blockchain nodes associated with the blockchain network. The method may include providing, via the blockchain node of the first device, the parameters to an analytics engine of the first device, and performing, via the analytics engine of the first device, a data analytics technique on the parameters to generate an offer with optimized parameters. The method may include providing, by the first device, the offer with the optimized parameters to the smart contract associated with the second device, and receiving, via the blockchain node of the first device, an indication of acceptance of the offer based on providing the offer with the optimized parameters to the smart contract associated with the second device. The method may include causing, by the first device, the optimized parameters to be implemented based on receiving the indication of acceptance of the offer.

BRIEF DESCRIPTION OF THE DRAWINGS

FIGS. 1A-1G are diagrams of overviews of example implementations described herein;

FIG. 4 is a flow chart of an example process for utilizing an analytics engine with multiple blockchain nodes.

DETAILED DESCRIPTION

The following detailed description of example implementations refers to the accompanying drawings. The same reference numbers in different drawings may identify the same or similar elements.

A functionality of blockchain technology is that a blockchain permits processes to be automated. A process may get more complex when more parties are involved in the process and when the parties rely on computations associated with the process (e.g., computations for setting a threshold for an action, for determining whether the threshold for the action is satisfied, and/or the like). However, blockchain technology is unable to intelligently handle process automation when the process becomes complex. Furthermore, by design, blockchain technology is not suitable for handling the computations (e.g., optimization computations, prediction problems, and/or the like) associated with complex processes.

Some implementations, described herein, may associate an analytics engine (e.g., to perform computations associated with complex processes) with each node of a multiple node blockchain. In some implementations, associating the analytics engine with multiple blockchain nodes may provide a decentralized solution for executing analytics on blockchain technology with smart contract capabilities. In some implementations, each blockchain node may utilize the analytics engine to perform computations associated with complex processes and to post results of the computations to a smart contract.

In this way, the decentralized solution for executing analytics in a blockchain may conserve resources (e.g., processor resources, memory resources, and/or the like) over a centralized solution for executing analytics in a blockchain. For example, the centralized solution may associate a single analytics engine with a single node of a multiple node blockchain, and the single analytics engine is required to execute all of the computations (e.g., requiring large amounts of processing and memory resources) for all of the blockchain nodes. Furthermore, the single node becomes a single point of failure for the centralized solution, such that if the single node fails no computations are executed.

Figure 1A:
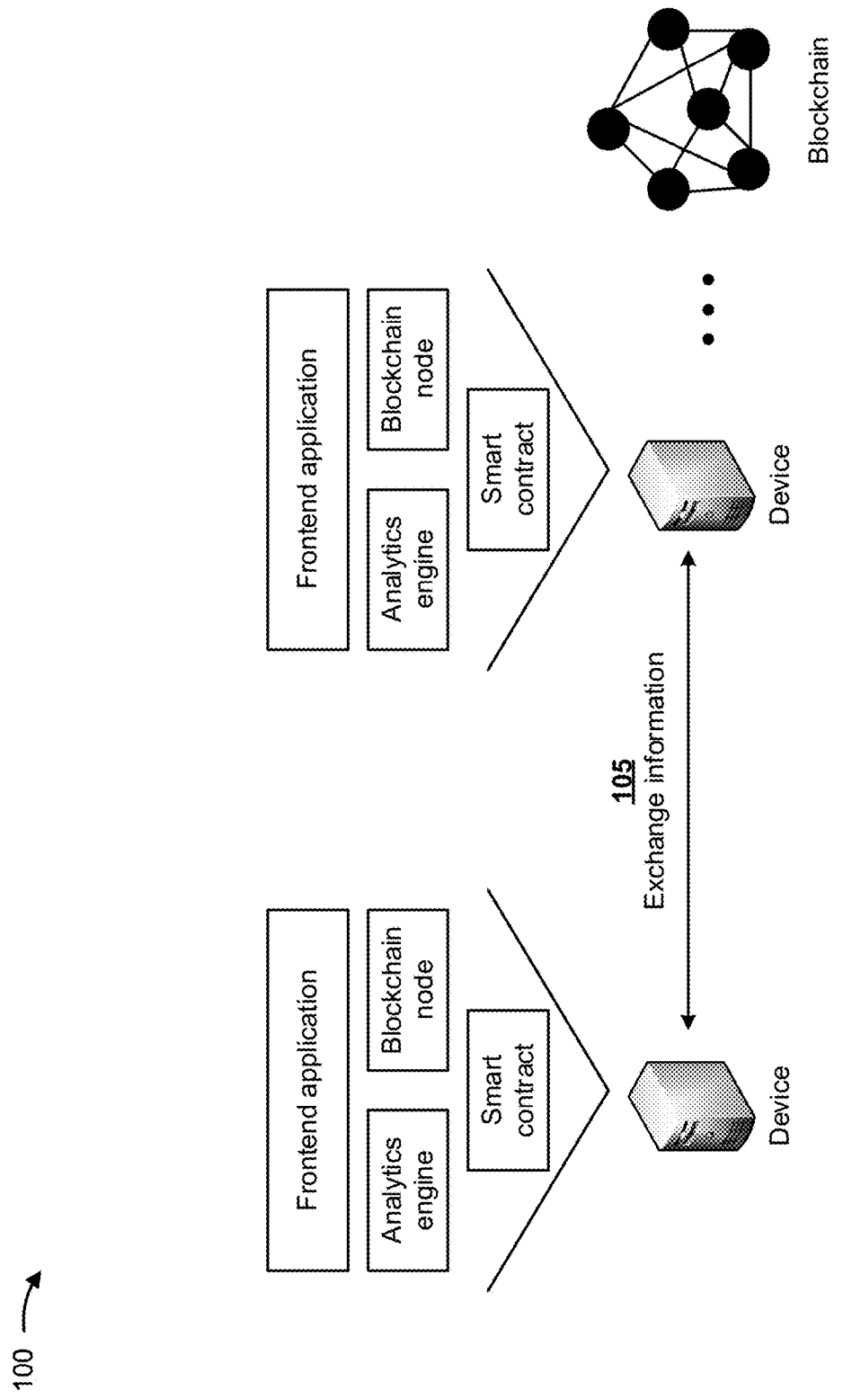

FIGS. 1A-1G are diagrams of overviews of example implementations 100 described herein. As shown in FIG. 1A, a decentralized solution for executing analytics on a blockchain with smart contract capabilities may be provided by a plurality of nodes associated with a blockchain. One or more nodes of the blockchain may be provided in a device, such as a computing device, a network device, and/or the like, connected to a network. Each device may include a frontend application, an analytics engine, a blockchain node, and/or the like. The blockchain node may create smart contracts (e.g., that include account addresses) and may deploy the smart contracts in the blockchain (e.g., shown separately but deployed in the blockchain node).

The frontend application may include an application with which a user of the device may directly interact, an application associated with a functionality of the device, and/or the like. For example, the frontend application may be associated with markup and web languages, such as a hypertext markup language (HTML), a sheet style language (e.g., cascading style sheets (CSS)), a JavaScript language, and/or the like, libraries used in the languages, such as syntactically awesome sheets (Sass), jQuery, and/or the like.

The analytics engine may include an application capable of performing a data analytics technique that examines data sets in order to draw conclusions about the data sets (e.g., data extracted from external sources or data obtained based on querying the blockchain, and which may be merged locally). For example, the data analytics technique may include exploratory data analysis (EDA) (e.g., which aims to find patterns and relationships in data), confirmatory data analysis (CDA) (e.g., which applies statistical techniques to determine whether hypotheses about a data set are true or false), quantitative data analysis (e.g., analysis of numerical data with quantifiable variables that can be compared or measured statistically), qualitative data analysis (e.g., understanding content of non-numerical data like text, images, audio, and video, including common phrases, themes, and points of view), data mining (e.g., which involves sorting through large data sets to identify trends, patterns, and relationships), predictive analytics (e.g., which seeks to predict customer behavior, equipment failures, and other future events), machine learning (e.g., an artificial intelligence technique that uses automated algorithms to process data sets that cannot be processed objectively by a human actor), and/or the like. In some implementations, the data analytics technique may include a technique that automatically processes data sets (e.g., that includes hundreds, thousands, millions, billions, or more of data points) that cannot be objectively processed by a human actor.

The blockchain node may validate transactions and blockchain blocks; may include an application that enables the network of nodes to accept transactions and blockchain blocks from other nodes, validate the transactions and blockchain blocks, and relay the transactions and blockchain blocks to other nodes; may include an application that maintains a healthy blockchain network; may include an application that provides built-in wallet functionality; and/or the like.

The smart contract may include a computer protocol that facilitates, verifies, or enforces a negotiation or a performance of a contract; a computer protocol that provides security that is superior to traditional contract law and reduces other transaction costs associated with contracts; multi-signature accounts; a computer protocol that provides payment channels, escrows, time locks, atomic cross-chain trading, oracles (e.g., agents that locate and verify real world occurrences information, and submits this information to a blockchain to be used in smart contracts), and/or multi-party lottery with no operator; and/or the like.

As shown by reference number 105, assume that two devices of the blockchain exchange information. In some implementations, the information may include information associated with transactions conducted between the two devices of the blockchain. For example, a first device may provide information associated with a smart contract to a second device (e.g., or the first device may deploy the smart contract to a blockchain, and the smart contract may include certain characteristics or restrictions similar to a physical contract), and the second device may process the information (e.g., with the blockchain node and/or the analytics engine) to generate a result (e.g., an acceptance of the terms of the smart contract). The second device may provide the result to the first device, and a contract may be established between the first device and the second device. Subsequently, the second device may perform requirements associated with the smart contract.

As shown in FIG. 1B, assume that a first device is associated with a first account (e.g., Account 1), such as an account that performs a financial transaction. Further assume that a second device is associated with a second account (e.g., Account 2), such as an account that requests performance of the financial transaction. The smart contract of the second device may include an address with which other accounts (e.g., the first account) can interact. The smart contract of the second device may specify data and constraints for performance of the financial transaction, and the second device may provide the data and constraints to the first device, as indicated by reference number 110. The data and constraints may include, for example, information associated with the financial transaction (e.g., selling bonds in a market), information associated with constraints of the financial transaction (e.g., how many bonds to sell, a minimum selling price, particular purchasers to which to offer the bonds, a minimum profit sought on the sale, and/or the like), timing information (e.g., when to sell the bonds, a date by which to sell the bonds, and/or the like), parameters associated with the first account, parameters associated with the second account, variables associated with the financial transaction, and/or the like.

As further shown in FIG. 1B, the blockchain node of the first device may receive the data and constraints from the smart contract of the second device. The blockchain node may verify the data and constraints, may provide security measures for receiving the data and constraints, and/or the like. Since the smart contract may require performance of computations associated with a complex process (e.g., the financial transaction), the blockchain node may not be able to perform the computations, and may provide the data and constraints to the analytics engine. In some implementations, the blockchain node may automatically provide the data and constraints to the analytics engine. In some implementations, the blockchain node may determine whether the data and constraints are associated with a smart contract, and may provide the data and constraints to the analytics engine when the data and constraints are associated with a smart contract. In some implementations, the blockchain node may determine that the data and constraints are not associated with a smart contract, and may not provide the data and constraints to the analytics engine. In some implementations, the analytics engine may include user defined restrictions. If the restrictions are satisfied, the blockchain node need not participate in an interaction with the smart contract and the analytics engine need not perform computations associated with the smart contract.

Figure 1C:
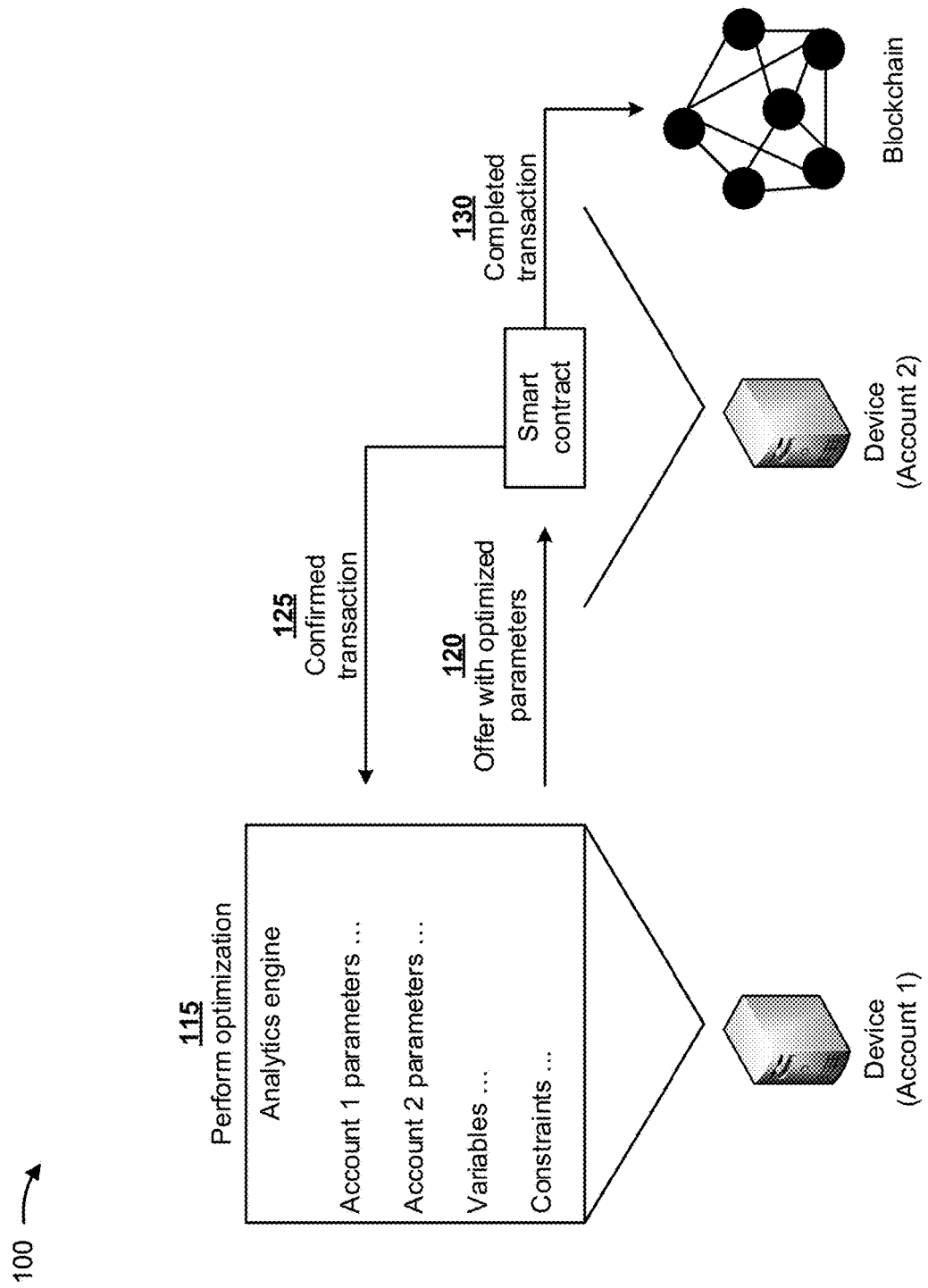

As shown in FIG. 1C, and by reference number 115, the analytics engine may perform a computation (e.g., a data analytics technique, such as an optimization) based on the data and constraints. In some implementations, the analytics engine may determine optimized parameters associated with the first account and optimized parameters associated with the second account based on the data and constraints deployed in the smart contract. In some implementations, the analytics engine may calculate a maximum profit for the financial transaction based on the optimized parameters, and may generate an offer with the optimized parameters (e.g., "1000 bonds may be sold on January 1st to party A for a price of $100 per bond and profit of $500"). The first device may provide the offer with the optimized parameters to the smart contract deployed by the second device, as indicated by reference number 120. In some implementations, the blockchain node of the first device may provide the offer with the optimized parameters to the smart contract of the second device.

As further shown in FIG. 1C, the smart contract of the second device may receive the offer, as a transaction, with the optimized parameters, and may determine whether to accept the offer. If the smart contract determines that the offer is not acceptable, the smart contract may reject the offer (e.g., functions within the smart contract may check conditions and if the conditions are not satisfied may generate an error message) and may provide an indication of the rejection to the first device. If the smart contract determines that the offer is acceptable, the smart contract may accept the offer and may provide an indication of the acceptance to the first device, using a trigger for that. In some implementations, the indication of the acceptance may include confirmation of the transaction requested by the smart contract of the second device, as indicated by reference number 125. In some implementations, the smart contract may include a trigger that, if satisfied, causes generation of transactions to both devices confirming a deal. In some implementations, the smart contract of the second device may generate an indication of completion of the transaction, and may provide the indication of completion of the transaction to the blockchain (e.g., and to the first device), as indicated by reference number 130. The remaining nodes of the blockchain may be updated based on the indication of completion of the transaction. For example, if other nodes of the blockchain provided offers to the smart contract of the second device, the other nodes may be informed that the smart contract was awarded to the first device and not to the other nodes (e.g., if the smart contract is coded as such, and the smart contract may generate a list of other nodes and may send a message to the other nodes when, for example, an auction has ended).

In some implementations, the first device may perform the financial transaction based on confirmation of the transaction. For example, the first device may cause the financial transaction to occur (e.g., may cause 1000 bonds to be sold on January 1st to party A for a price of $100 per bond and profit of $500). In this example, once the financial transaction is completed, the first device may provide the profit of $500 to the second device.

Figure 1D:
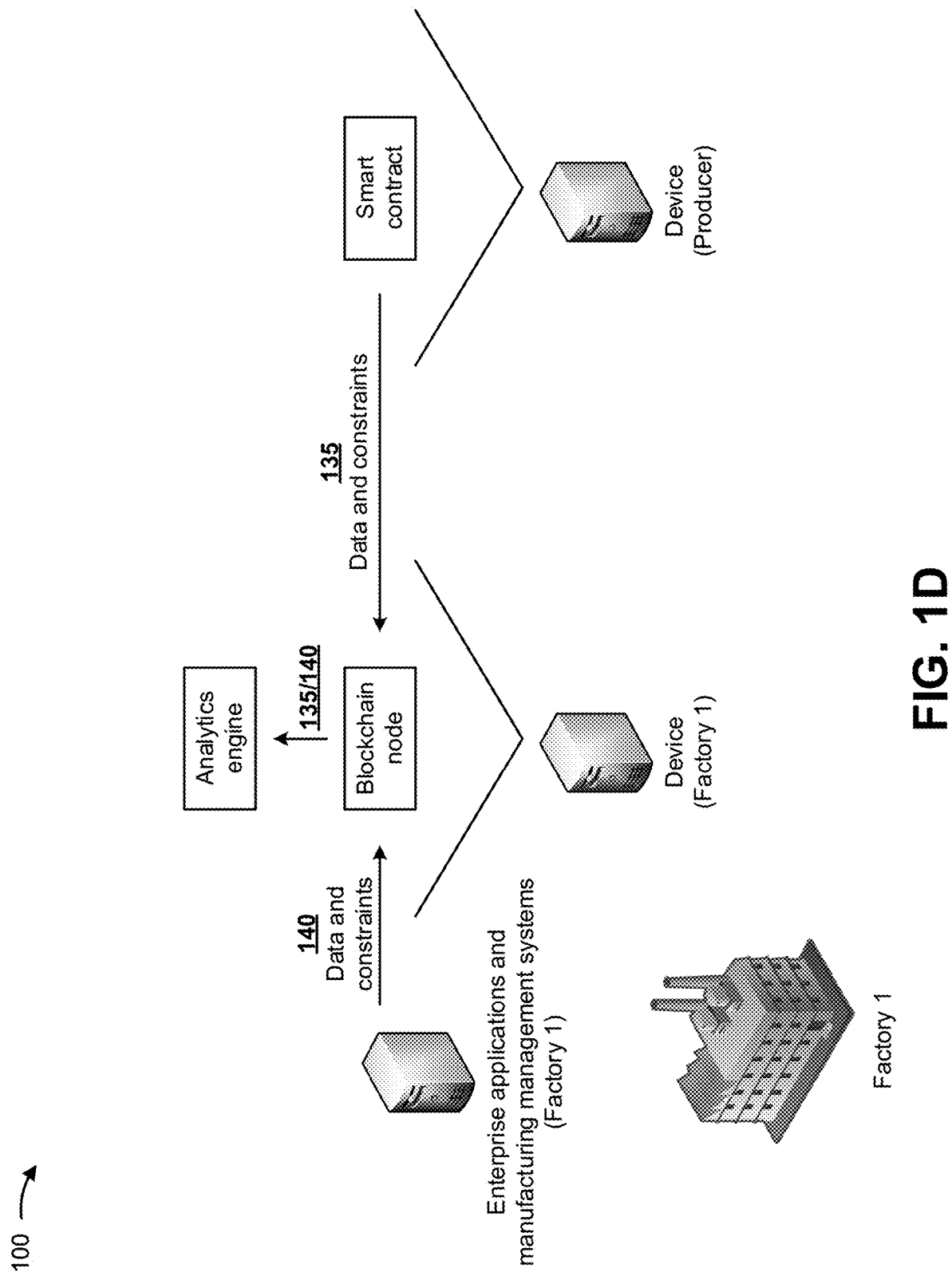

As shown in FIG. 1D, assume that a first device is associated with a first entity (e.g., Factory 1), such as a factory that makes tables. Further assume that a second device is associated with a second entity (e.g., Producer), such as a producer that sells tables. The smart contract of the second device may specify data and constraints for manufacturing tables to be sold by the producer, and the second device may provide the data and constraints to the blockchain node of the first device (e.g., due to the interaction of the first device with the smart contract deployed by the second device), as indicated by reference number 135. The data and constraints from the second device may include, for example, parameters specified by the producer for the tables, such as parameters associated with an available capacity of the factory (e.g., 1000 tables/month), parameters associated with available materials for the tables (e.g., wood, steel, or plastic), parameters associated a minimum lead time for the tables (e.g., three days), parameters associated with a minimum asking price for the tables (e.g., $50 per table for wood tables, $70 per table for steel tables, $30 per table for plastic tables), and/or the like.

In some implementations, the smart contract of the second device may include information associated with a definition of the product to be produced, materials to be used in making the product, a quantity of product pieces to be made, lead time for making the product pieces, a bid (e.g., a dollar amount per product piece), and/or the like. In some implementations, the second device may provide a user interface that allows a user of the second device to provide the information associated with the smart contract (e.g., a user interface for deploying the smart contract from an application being executed by the second device). For example, the user interface may include a product definition field into which the user can enter a definition of the product, a materials field from which the user can select a type of material (e.g., from a drop down list) for the product, a quantity field into which the user can enter a desired quantity of the product, a lead time field into which the user can enter a date for a desired lead time of the product, a bid field into which the user can enter a dollar amount of the bid for the product, and/or the like.

As further shown in FIG. 1D, enterprise applications and manufacturing management systems (hereinafter referred to as "the factory systems") may specify data and constraints associated with the factory. The factory systems may provide the data and constraints to the blockchain node of the first device, as indicated by reference number 140. In some implementations, the factory systems may include enterprise resource planning (ERP) systems and/or applications, manufacturing execution systems (MES), process control systems and/or applications, and/or the like.

The data and constraints from the factory systems may include, for example, parameters specified by the factory for the tables, such as parameters associated with a product produced by the factory (e.g., tables), parameters associated with a quantity of tables produced by the factory in a month (e.g., 800 tables), parameters associated with a material used by the factory to make the tables (e.g., wood), parameters associated a lead time for the tables (e.g., five days), parameters associated with a bid price for the tables (e.g., $45 per table for wood tables), and/or the like. The data and constraints from the factory systems may also include constraints indicating that the quantity of tables produced by the factory in a month must be less than the available capacity of the factory, that the material used by the factory to make the tables is included in the available materials for the tables, that the lead time for the tables is greater than the minimum lead time, that the bid price for the tables is greater than the minimum asking price for the tables, that a selling price of the tables is less than the bid price, and/or the like.

As further shown in FIG. 1D, the blockchain node of the first device may receive the data and constraints from the smart contract of the second device and from the factory systems. Since the smart contract may require performance of computations associated with a complex process (e.g., determining a quantity and a price of tables to be sold by the producer), the blockchain node may not be able to perform the computations, and may provide the data and constraints to the analytics engine. In some implementations, the blockchain node may automatically provide the data and constraints to the analytics engine. In some implementations, the blockchain node may determine whether the data and constraints are associated with a smart contract, and may provide the data and constraints to the analytics engine when the data and constraints are associated with a smart contract. In some implementations, the blockchain node may determine that the data and constraints are not associated with a smart contract, and may not provide the data and constraints to the analytics engine.

As shown in FIG. 1E, and by reference number 145, the analytics engine may perform a computation (e.g., a data analytics technique, such as an optimization) based on the data and constraints. In some implementations, the analytics engine may determine an offer with optimized parameters based on the factory parameters (e.g., "Product=Table," "Quantity=800," "Material=Wood," "Lead time=5 days," and "Bid price=$45"), based on the producer parameters (e.g., "Available capacity=1000/month," "Materials available=wood, steel, plastic," "Minimum lead time=3 days," and "Minimum asked price=$50, $70, $30"), and based on the constraints (e.g., "Quantity<Available capacity," "Materials in materials available," "Lead time>minimum lead time," "Bid price>minimum asked price," and "Selling price<bid price"). In some implementations, the optimized parameters may include a time stamp associated with an offer (e.g., indicating that the offer is valid until a particular time), a selling price of the tables (e.g., $45 per wood table), an offered quantity of the tables (e.g., 500 tables per month), other specifications (e.g., special instructions for handling the tables), and/or the like.

Figure 1F:
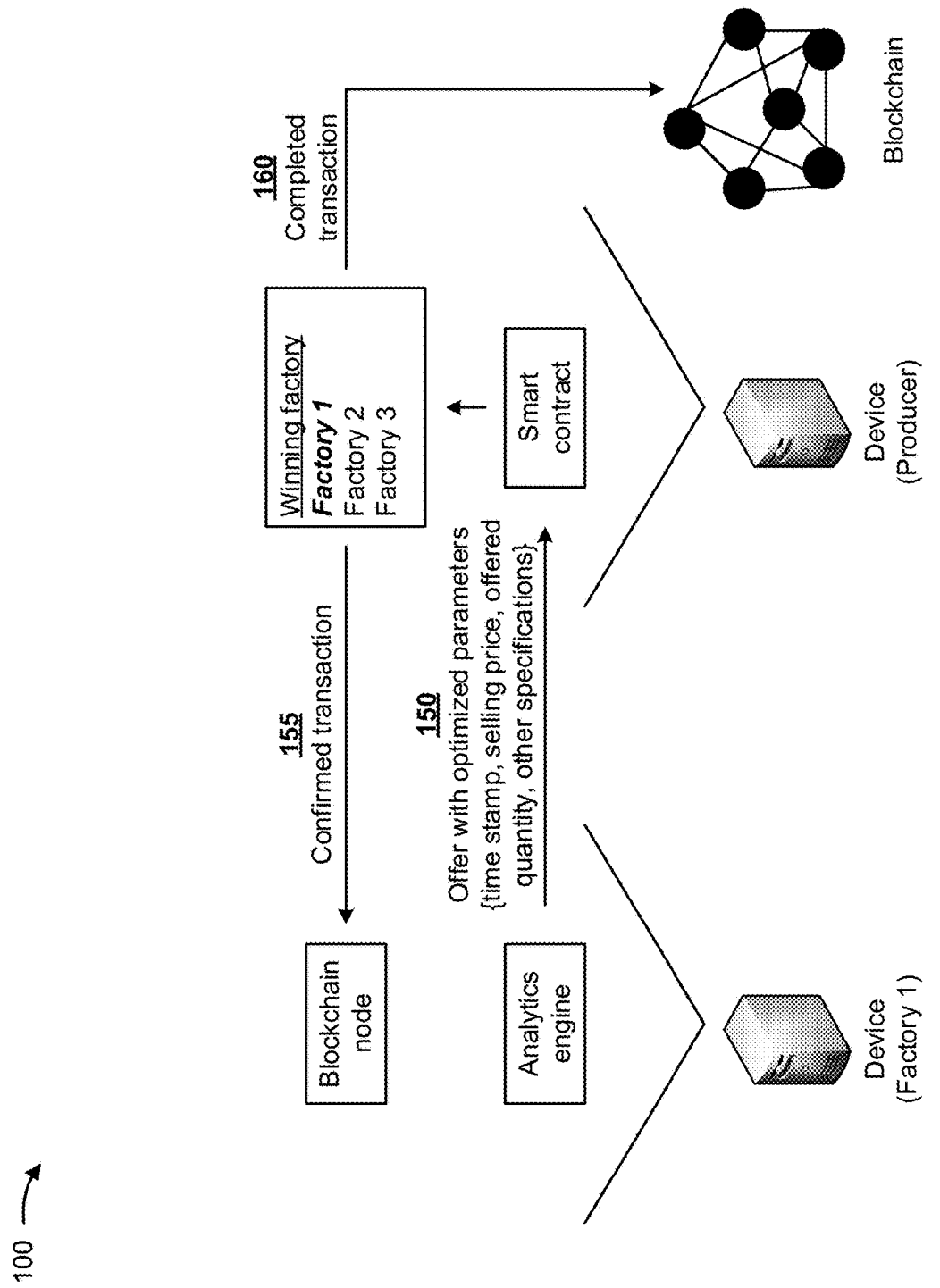

As shown in FIG. 1F, and by reference number 150, the first device may provide the offer with the optimized parameters (e.g., the time stamp, the selling price, the offered quantity, and the other specifications) to the second device. In some implementations, the blockchain node of the first device may provide the offer with the optimized parameters to the smart contract of the second device. As further shown in FIG. 1F, the smart contract of the second device may receive the offer with the optimized parameters, and may determine whether to accept the offer. For example, assume that smart contract deployed by the second device receives other offers from the other factories (e.g., Factory 2 and Factory 3). In such an example, the smart contract of the second device may determine which of the offers to accept (e.g., from Factory 1, Factory 2, or Factory 3). In some implementations, the analytics engine of the second device may determine which of the offers to accept. In such implementations, the analytics engine of the second device may perform a computation (e.g., a data analytics technique, such as an optimization) based on the offers, and may determine which of the offers to accept based on results of the computation.

In some implementations, the first device may submit, to the smart contract, information associated with a proposed fulfillment of the smart contract based on the optimization performed by the analytics engine. For example, the information associated with a proposed fulfillment of the smart contract may include a capacity of the factory to provide the product defined by the smart contract (e.g., a number of product pieces, a rate of product pieces per unit of time, etc.), materials that can be used to make the product pieces, specifications for the product pieces, lead time for the product pieces, a selling price (e.g., a dollar amount per product piece), and/or the like. In this way, a factory can submit an offer, to the smart contract, that is to be accepted or rejected on behalf of the producer.

If the smart contract determines that the offer from Factory 1 is not acceptable, the smart contract may reject the offer and may provide an indication of the rejection to the first device and the second device may provide a counter proposal to the offer to the first device. If the smart contract determines that the offer from Factory 1 is acceptable, the smart contract may accept the offer and may provide an indication of the acceptance to the blockchain node of the first device. In some implementations, the indication of the acceptance may include confirmation of the transaction requested by the smart contract of the second device, as indicated by reference number 155 in FIG. 1F. In some implementations, the smart contract of the second device may generate an indication of completion of the transaction, and may provide the indication of completion of the transaction to the blockchain (e.g., and to the first device), as indicated by reference number 160 in FIG. 1F. The remaining nodes of the blockchain may be updated based on the indication of completion of the transaction. For example, if other factories (e.g., Factory 2 and Factory 3) of the blockchain provided other offers to the smart contract of the second device, the other factories may be informed that the smart contract was awarded to the first device (e.g., to Factory 1) and not to the other factories.

Figure 1G:
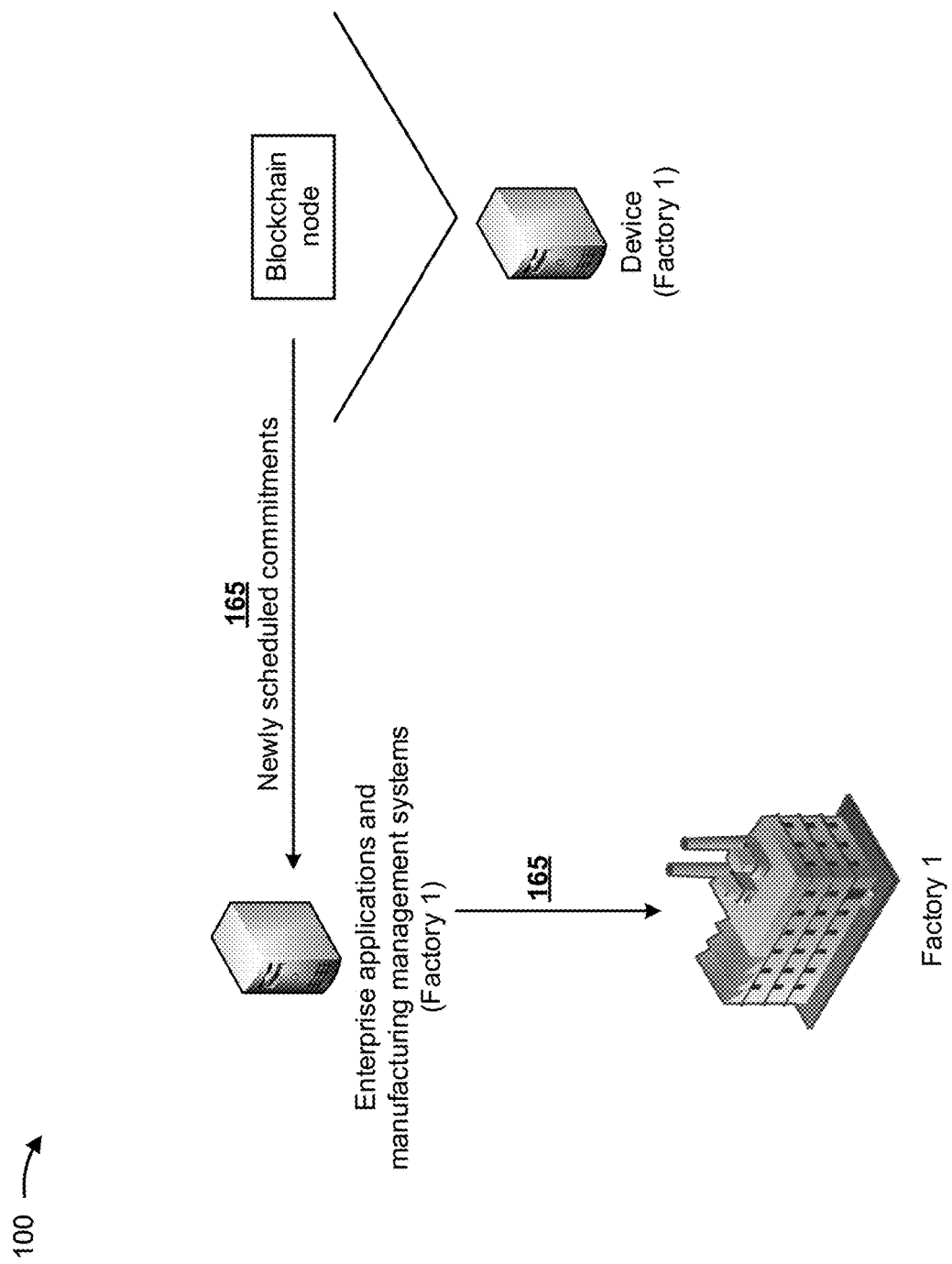

As shown in FIG. 1G, and by reference number 165, the blockchain node of the first device may provide newly scheduled commitments to the factory systems. In some implementations, the first device may provide the newly scheduled commitments to the factory systems based on confirmation of the transaction. In some implementations, the newly scheduled commitments may include information associated with a quantity of tables to be manufactured for the producer in a month, a time period for when the tables are to be manufactured, specifications (e.g., dimensions, materials, etc.) for the tables, and/or the like. In some implementations, the factory systems may cause the newly scheduled commitments to be satisfied (e.g., may cause the factory to manufacture 500 wood tables per month at a cost of less than at least $45 per table). The factory may provide the manufactured tables to the producer, and the producer may sell or distribute the tables.

In some implementations, the decentralized solution for executing analytics in a blockchain may allow federated learning (e.g., a method to train a model over distributed data that is owned by different parties) to be implemented. In some implementations, the distributed data and the model may be encrypted to protect privacy and intellectual property. For example, homomorphic encryption may be utilized to prevent disclosure of the model and the distributed data that trains the model. In some implementations, the federated learning may permit monetization of the distributed data without losing control over the distributed data.

In some implementation, a first device associated with a first user may deploy a smart contract that includes specifications of a model (e.g., a neural network model). The first user may wish to have the model trained with as much data as possible so that the model may later be used to determine predictions. A second device associated with a second user may query the smart contract to obtain information associated with the specifications of the model. The second user may utilize the second device to locally train the model with encrypted data stored in the second device. The second device may provide results (e.g., gradients) associated with training the model to the smart contract included in the first device. The smart contract may determine whether the results are correct and may update the model based on the results when the results are determined to be correct. Simultaneously and/or subsequently other devices, associated with other users, may train the model with data to generate results. Such results may be provided to the first device and may be utilized to further update the model when such results are determined to be correct. In this way, the first user may train the model with additional data and obtain an improved model. In some implementations, after the model is trained and improved, the first user may receive a reward (e.g., a monetary reward) that is locked in the smart contract.

In this way, some implementations, described herein, may provide an analytics engine for each node in a blockchain. This distributes computations across nodes of the blockchain and conserves resources (e.g., processor resources, memory resources, and/or the like) that would otherwise be used to perform such computations at a single centralized node. Furthermore, if the single centralized node fails, no computations will be executed until the single centralized node is repaired. Finally, providing an analytics engine for each node in the blockchain conserves computing resources that would otherwise be used to execute a transaction, such as computing resources associated with performing searches, bargaining and decision making, policy enforcement, and/or the like.

As indicated above, FIGS. 1A-1G are provided merely as examples. Other examples are possible and may differ from what was described with regard to FIGS. 1A-1G.

Figure 2:
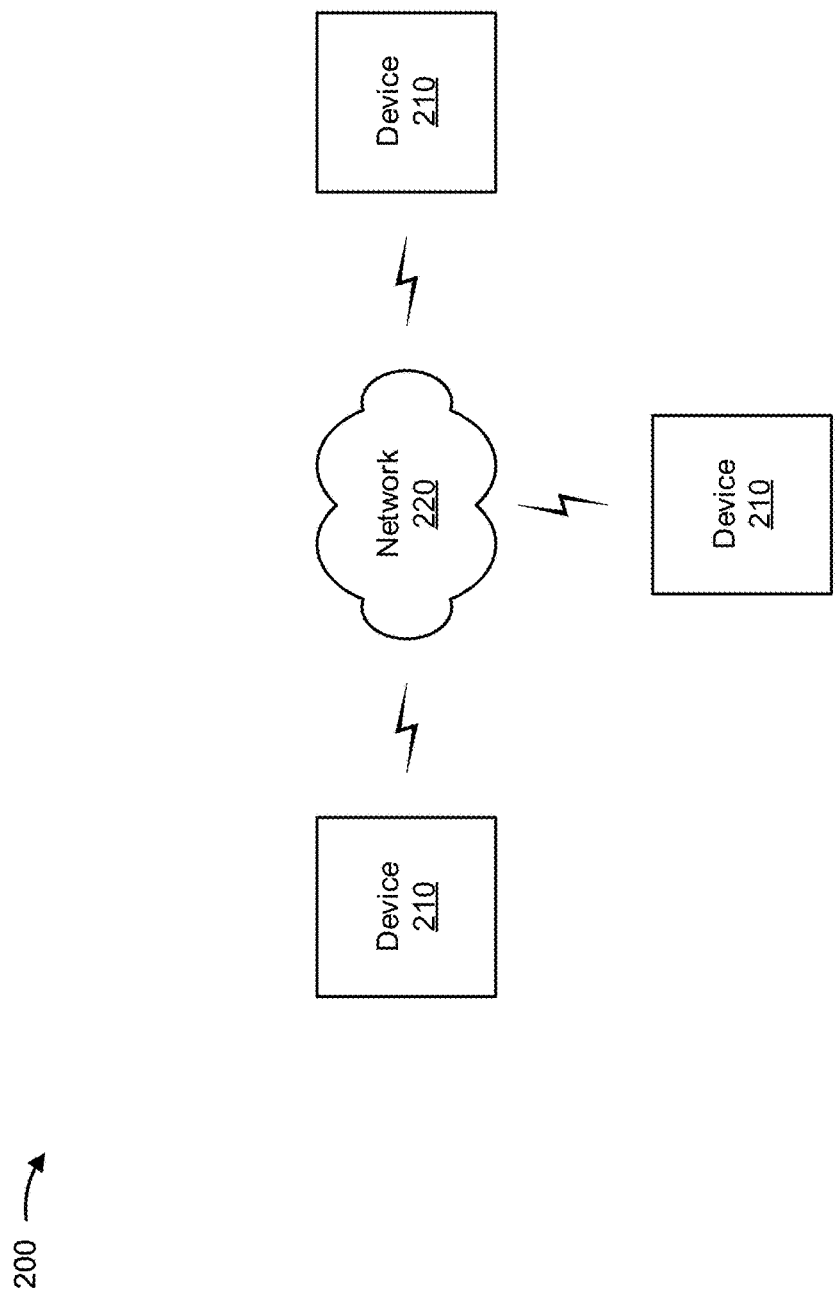
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include multiple devices 210 and a network 220. Devices of environment 200 may interconnect via wired connections, wireless connections, or a combination of wired and wireless connections.

Device 210 includes one or more devices capable of receiving, generating, storing, processing, and/or providing information, such as information described herein. For example, device 210 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a global positioning system (GPS) device, a server device, a group of server devices, a network device (e.g., a firewall, a router, a gateway, a switch, a hub, a bridge, a reverse proxy, a proxy server, a security device, an intrusion detection device, a load balancer, etc.), or a similar type of device.

In some implementations, device 210 may receive information from and/or transmit information to another device 210 in environment 200. In some implementations, one or more of the functions performed by device 210 may be hosted in a cloud computing environment or may be partially hosted in a cloud computing environment. In some implementations, device 210 may be a physical device implemented within a housing, such as a chassis. In some implementations, device 210 may be a virtual device implemented by one or more computer devices of a cloud computing environment or a data center.

Network 220 includes one or more wired and/or wireless networks. For example, network 220 may include may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. In some implementations, there can be many client devices 210 and/or network devices 210 (e.g., tens, hundreds, thousands, or more client devices 210 and/or network devices 210).

Figure 3:
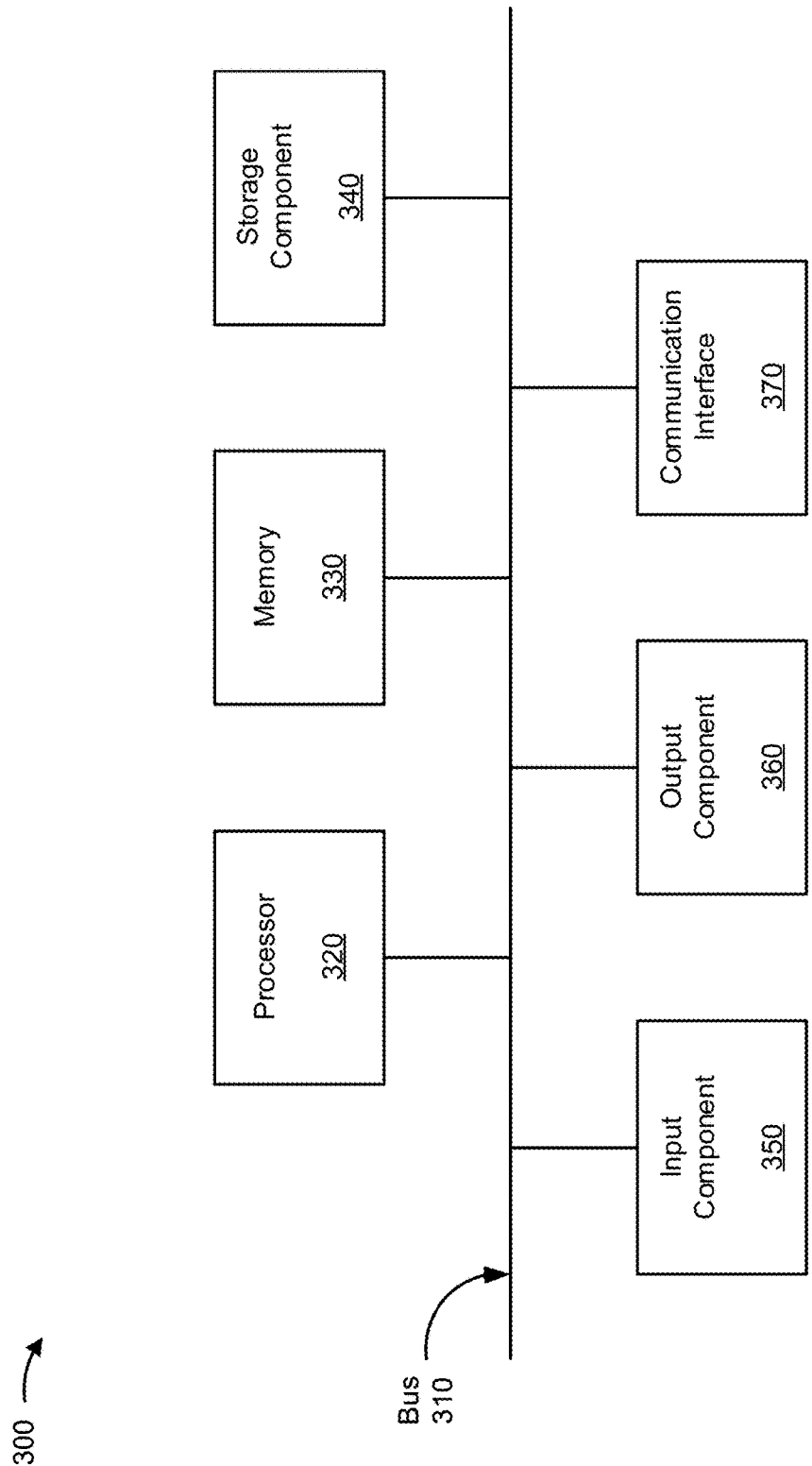
FIG. 3 is a diagram of example components of one or more devices of FIG. 2.

FIG. 3 is a diagram of example components of a device 300. Device 300 may correspond to device 210. In some implementations, device 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing an analytics engine with multiple blockchain nodes. In some implementations, one or more process blocks of FIG. 4 may be performed by device 210. In some implementations, one or more process blocks of FIG. 4 may be performed by another device or a group of devices separate from or including device 210, such as another device 210 or a combination of devices 210.

As shown in FIG. 4, process 400 may include receiving, via a blockchain node, data and constraints associated with a blockchain smart contract (block 410). For example, device 210 may include a blockchain node, and may receive, via the blockchain node, data and constraints associated with a blockchain smart contract. In some implementations, a blockchain may be provided by a plurality of nodes (e.g., devices 210) interconnected in a peer-to-peer network. In some implementations, each device 210 may include an analytics engine, a blockchain node, a smart contract, and/or the like.

The analytics engine may include an application capable of performing a data analytics technique that examines data sets in order to draw conclusions about the data sets. For example, the data analytics technique may include EDA, CDA, quantitative data analysis, qualitative data analysis, data mining, predictive analytics, machine learning, and/or the like. The blockchain node may validate transactions and blockchain blocks, maintain a healthy blockchain network, provide built-in wallet functionality, and/or the like. The smart contract may be associated with a computer protocol that facilitates, verifies, and/or enforces a negotiation or a performance of a contract, and/or the like.

In some implementations, as described above in connection with FIG. 1D, a first device 210 and second device 210 may be associated with a blockchain. The first device 210 may be associated with a first factory (e.g., Factory 1) that makes tables, and the second device 210 may be associated with a producer (e.g., Producer) that sells tables. A smart contract of the second device 210 may specify data and constraints for manufacturing tables to be sold by the producer, and a blockchain node of the first device 210 interacts with the data and constraints. The data and constraints from the second device 210 may include parameters specified by the producer for the tables, such as the parameters described above in connection with FIG. 1D.

In some implementations, as described above in connection with FIG. 1D, factory systems may specify data and constraints associated with the factory. The factory systems may provide the data and constraints to the blockchain node of the first device 210. In some implementations, the factory systems may include ERP systems and/or applications, IVIES, process control systems and/or applications, and/or the like. The data and constraints from the factory systems may include parameters specified by the factory for the tables, such as the parameters described above in connection with FIG. 1D. The data and constraints from the factory systems may also include the constraints described above in connection with FIG. 1D.

In some implementations, the first device 210 may store the data and constraints in a data structure associated with first device 210. In some implementations, the data structure may be provided in the first device 210 (e.g., in a memory of the first device 210), in a device separate from and accessible by the first device 210, and/or the like. In some implementations, the data structure may include a database, a tree, a linked list, a list, and/or the like.

In this way, the first device 210 may receive, via the blockchain node, the data and constraints associated with the blockchain smart contract.

As further shown in FIG. 4, process 400 may include providing, via the blockchain node, the data and constraints to an analytics engine (block 420). For example, device 210 may provide, via the blockchain node, the data and constraints to an analytics engine associated with device 210. In some implementations, as described above in connection with FIG. 1D, when the smart contract of the second device 210 requires performance of computations associated with a complex process (e.g., complex computations associated with manufacturing tables to be sold by the producer), the blockchain node of the first device 210 may not be able to perform the computations, and may provide the data and constraints to the analytics engine of the first device 210.

In some implementations, the blockchain node of the first device 210 may automatically provide the data and constraints to the analytics engine of the first device 210. In some implementations, the blockchain node of the first device 210 may determine whether the data and constraints are associated with a smart contract, and may provide the data and constraints to the analytics engine of the first device 210 when the data and constraints are associated with a smart contract. In some implementations, the blockchain node of the first device 210 may determine that the data and constraints are not associated with a smart contract, and may not provide the data and constraints to the analytics engine of the first device 210. In such implementations, the blockchain node of the first device 210 may process the data and constraints since the data and constraints do not require computations associated with a smart contract. In some implementations, the blockchain node may determine that the data and constraints are associated with the smart contract, when the data and constraints are associated with a computation (e.g., an optimization computation, a prediction problem, and/or the like) of a complex process. In some implementations, the blockchain node may determine that the data and constraints are associated with the smart contract, when the data and constraints include information identifying the smart contract.

In this way, the first device 210 may provide, via the blockchain node, the data and constraints to the analytics engine associated with the first device 210.

As further shown in FIG. 4, process 400 may include performing, via the analytics engine, an optimization of the data and constraints to generate an offer with optimized parameters (block 430). For example, device 210 may perform, via the analytics engine, an optimization of the data and constraints to generate an offer with optimized parameters. In some implementations, as described above in connection with FIG. 1E, the analytics engine of the first device 210 may perform one or more computations (e.g., a data analytics technique, such as an optimization) based on the data and constraints. In some implementations, the analytics engine of the first device 210 may determine an offer with optimized parameters based on the factory parameters, the producer parameters, the constraints, and/or the like. In some implementations, the optimized parameters may include a time stamp associated with an offer, a selling price of the tables, an offered quantity of the tables, other specifications, and/or the like.

In some implementations, the analytics engine of the first device 210 may utilize a data analytics technique that organizes the data and constraints into a particular format (e.g., a structured data format), and cleanses the formatted data and constraints by eliminating duplicate information, correcting erroneous information, augmenting incomplete information, and/or the like. The data analytics technique may apply one or more models (e.g., inferential statistics, regression analysis, and/or the like) to the cleansed and formatted data and constraints in order to identify relationships (e.g., correlation, causation, and/or the like) among variables of the data and constraints. The data analytics technique may determine the offer with the optimized parameters based on the identified relationships among the variables of the data and constraints.

In this way, the first device 210 may perform, via the analytics engine of the first device 210, an optimization of the data and constraints to generate an offer with optimized parameters.

As further shown in FIG. 4, process 400 may include providing the offer with the optimized parameters to a device associated with the blockchain smart contract (block 440). For example, a first device 210 may provide the offer with the optimized parameters to a second device 210 associated with the blockchain smart contract. In some implementations, as described above in connection with FIG. 1F, the first device 210 may provide the offer with the optimized parameters (e.g., the time stamp, the selling price, the offered quantity, and the other specifications) to the second device 210. In some implementations, the blockchain node of the first device 210 may provide the offer with the optimized parameters to the smart contract of the second device 210.

In this way, the first device 210 may provide the offer with the optimized parameters to the smart contract deployed by the second device 210.

As further shown in FIG. 4, process 400 may include receiving, via the blockchain node, a confirmation of a transaction associated with the blockchain smart contract (block 450). For example, device 210 may receive, via the blockchain node, a confirmation of a transaction associated with the blockchain smart contract. In some implementations, as described above in connection with FIG. 1F, the smart contract of the second device 210 may receive the offer with the optimized parameters, and may determine whether to accept the offer. If the second device 210 offered the smart contract to other factories and received other offers from the other factories, the smart contract of the second device 210 may determine which of the offers to accept. In some implementations, the smart contract of the second device 210 may provide the offer to an analytics engine of the second device 210, and the analytics engine may perform analytics on the offer to determine whether to accept the offer. For example, the analytics engine of the second device 210 may perform an analytics technique (e.g., an optimization) on the offer to determine how the offer will affect the sales of the tables, the profits of the producer generated by the tables, the overall balance sheet of the producer, sales of other products offered by the producer, and/or the like. Based on the results of the analytics technique, the analytics engine of the second device may determine whether to accept the offer, by sending a transaction to the smart contract that it deployed earlier.

If the smart contract of the second device 210 determines that offer from the first device 210 is not acceptable, the smart contract of the second device 210 may reject the offer and may provide an indication of the rejection to the first device 210. If the smart contract of the second device 210 determines that the offer from the first device 210 is acceptable, the smart contract of the second device 210 may accept the offer and may provide an indication of the acceptance to the blockchain node of the first device 210. In some implementations, the indication of the acceptance may include confirmation of the transaction requested by the smart contract of the second device 210.

In some implementations, the smart contract of the second device 210 may generate an indication of completion of the transaction, and may provide the indication of completion of the transaction to the remaining nodes of the blockchain. The remaining nodes of the blockchain may be updated based on the indication of completion of the transaction. For example, if other factories of the blockchain provided other offers to the smart contract of the second device 210, the other factories may be informed that the smart contract was awarded to the first device 210 and not to the other factories.

In this way, the first device 210 may receive the confirmation of the transaction associated with the smart contract of the second device 210.

As further shown in FIG. 4, process 400 may include causing the offer with the optimized parameters to be implemented based on receiving the confirmation of the transaction (block 460). For example, device 210 may cause the offer with the optimized parameters to be implemented based on receiving the confirmation of the transaction. In some implementations, as described above in connection with FIG. 1G, the blockchain node of the first device 210 may provide newly scheduled commitments to the factory systems. In some implementations, the first device 210 may provide the newly scheduled commitments to the factory systems based on confirmation of the transaction. In some implementations, the newly scheduled commitments may include information associated with a quantity of tables to be manufactured for the producer in a month, a time period for when the tables are to be manufactured, specifications for the tables, and/or the like. In some implementations, the factory systems may cause the newly scheduled commitments to be satisfied (e.g., may cause the factory to manufacture a quantity of wood tables per month at a specific cost). The factory may provide the manufactured tables to the producer (e.g., satisfying the smart contract), and the producer may sell or distribute the tables. In some implementations, the factory systems may cause particular equipment at the factory to produce certain objects, may cause an order for materials/parts to be automatically placed, may populate calendars with meetings of responsible parties to discuss progress, may cause an account of one party to be credited or debited at certain points in time, may schedule future credits/debits at milestones, may set milestones, may reserve vehicles for shipping, may schedule inspections, and/or the like.

In this way, the first device 210 may cause the offer with the optimized parameters to be implemented based on receiving the confirmation of the transaction.

In some implementations, associating an analytics engine with each node of a multiple node blockchain, as described herein, may solve business problems by creating transparency and reducing asymmetry of information in a manufacturing environment in which companies are related to each other via a buy-sell model (e.g., such that a company buying a product from another company has access to a sell process of the other company, but does not have access to a manufacturing process of the other company). In this case, associating an analytics engine with each node of a multiple node blockchain allows a buyer (e.g., a producer) to have access to the manufacturing process of a supplier (e.g., a factory). This creates a marketplace with full transparency, and reduces the asymmetry of information and the transaction costs associated with finding new suppliers.

In some implementations, associating an analytics engine with each node of a multiple node blockchain, as described herein, may provide a secure and automated solution in an environment that includes a buyer, a supplier, and a transportation entity. For example, the buyer may be a producer, the supplier may be a factory, and the transportation entity may be a shipping company that transports products from the supplier to the buyer. In some implementations, associating an analytics engine with each node of a multiple node blockchain, as described herein, may apply to a production environment with producers and factories, and may provide a secure and automated marketplace between the producers and the factories. The marketplace may reduce transaction costs that occur when the cost of producing a good is through a market rather than within a company. Carrying out a market transaction typically requires determining with which parties to deal, conducting negotiations leading up to a bargain, drawing up a contract, undertaking an inspection needed to make sure that terms of the contract are being observed, and/or the like. Providing the secure and automated marketplace may reduce transaction costs such as search and information costs, bargaining and decision costs, policing and enforcement costs, and/or the like.

In some implementations, associating an analytics engine with each node of a multiple node blockchain, as described herein, may allow one or more producers to use a shared pool of manufacturing resources (e.g., one or more factories) in an optimal manner. In some implementations, associating an analytics engine with each node of a multiple node blockchain may allow for interaction between the producers and smart contracts, may add an extra layer of security to protect physical resources and intellectual property of the producers, may add a method of payment, and may fully automate production planning decisions.

In some implementations, associating an analytics engine with each node of a multiple node blockchain, as described herein, may provide new properties to a marketplace associated with a blockchain. Such properties may include immutability of transactions, automation, elimination of a central authority (e.g., which reduces operational costs), auditability of the blockchain, secure data, prevention of a single point of failure, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In some implementations, if a smart contract requires performance of an extremely complex computation (e.g., simulating a design for an airplane wing, and determining costs associated with manufacturing the airplane wing) or performance of multiple computations, an analytics engine of a device receiving the smart contract may be unable to perform the complex computation or the multiple computations. In such implementations, the device with the analytics engine may provide portions of the complex computation or the multiple computations to other analytics engines provided in other devices associated with the device. The analytics engine and the other analytics engines may perform each of the portions of the complex computation or the multiple computations, and may provide results. Such an arrangement may enable multiple analytics engines to be pooled to together to solve a complex computation or multiple computations. In such an arrangement, if one of the analytics engines becomes unavailable, another analytics engine may be allocated to perform the functions of the unavailable analytics engine.

In some implementations, the blockchain node, the smart contract, and the analytics engine may be connected to a cloud-based manufacturing model that manages a shared pool of manufacturing technologies (e.g., three-dimensional printers). The cloud-based manufacturing model may be based on an Internet of Things (IoT) architecture that permits full management of industrial devices. In some implementations, the cloud-based manufacturing model may include a networked manufacturing model that exploits on-demand access to a shared collection of diversified and distributed manufacturing resources to form temporary and reconfigurable production lines that enhance efficiency, reduce product lifecycle costs, and allow for optimal resource allocation in response to variable customer-generated tasks.

Some implementations, described herein, may associate an analytics engine (e.g., to perform computations associated with complex processes) with each node of a multiple node blockchain. In some implementations, associating the analytics engine with multiple blockchain nodes may provide a decentralized solution for executing analytics on blockchain technology with smart contract capabilities. In some implementations, each blockchain node may utilize the analytics engine to perform computations associated with complex processes and to post results of the computations to a smart contract.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A first device, comprising: a memory; and one or more processors, operatively coupled to the memory, to: receive, by the first device and from a first entity associated with the first device, a first set of data and constraints; receive, via a blockchain node associated with the first device, and from a second entity associated with a second device, a second set of data and constraints, the first entity and the second entity being associated with performing a transaction associated with a smart contract; determine, via the blockchain node, whether a plurality of sets of data and constraints, including the first set of data and constraints and the second set of data and constraints, are associated with the smart contract, the smart contract being associated with the second device that is different than the first device, the first device and the second device being provided in a blockchain network, the first device being associated with a first analytics engine, the second device being associated with another blockchain node and a second analytics engine, the second analytics engine being different from the first analytics engine, and the blockchain node and the other blockchain node being part of a plurality of blockchain nodes associated with the blockchain network; determine, via the blockchain node and based on determining whether the plurality of sets of data and constraints are associated with the smart contract, whether to provide the plurality of sets of data and constraints to the first analytics engine or to process the plurality of sets of data and constraints by the blockchain node; provide one or more portions of a plurality of computations associated with the smart contract to one or more third analytics engines associated with one or more third devices when the first analytics engine cannot perform the one or more portions of the plurality of computations, the one or more third devices being provided in the blockchain network and being associated with the first device, and the first analytics engine performing a particular portion of the one or more portions of the plurality of computations and the one or more third analytics engines performing one or more different portions of the plurality of computations; perform, via the first analytics engine, a data analytics technique on the plurality of sets of data and constraints to generate an offer with optimized parameters with respect to an initial set of parameters; provide the offer with the optimized parameters to the smart contract; receive, via the blockchain node, a confirmation of the transaction based on providing the offer with the optimized parameters to the smart contract; cause the offer with the optimized parameters to be implemented based on receiving the confirmation of the transaction; and train, by one or more devices that include at least one of the first device or the second device, a model associated with the smart contract, with encrypted data stored on the one or more devices, the training comprising associating a reward with the smart contract based on the model being trained, and the reward being received by the one or more devices.

2. The first device of claim 1, where the one or more processors are further to:
receive, via the blockchain node, system information from one or more systems of an entity associated with the first device,
the system information including parameters and constraints associated with the entity; and
perform, via the first analytics engine, the data analytics technique on the system information and the plurality of sets of data and constraints to generate the offer with the optimized parameters.

3. The first device of claim 2, where the parameters associated with the entity include one or more of:
a parameter associated with a product produced by the entity,
a parameter associated with a quantity of the product produced by the entity in a time period,
a parameter associated with a material used by the entity to make the product,
a parameter associated with a lead time for the product, or
a parameter associated with a bid price for the product.

4. The first device of claim 1, where the plurality of sets of data and constraints associated with the smart contract include one or more of:
a parameter associated with an available capacity of an entity associated with the first device,
a parameter associated with available materials of the entity,
a parameter associated with a minimum lead time for a product, or
a parameter associated with a minimum asking price for the product.

5. The first device of claim 1, where the first device receives, from the second device, an indication of completion of a transaction associated with the smart contract when the second device accepts the offer.

6. The first device of claim 1, where the one or more processors, when performing, via the first analytics engine, the data analytics technique on the plurality of sets of data and constraints, are to:
organize the plurality of sets of data and constraints into formatted data and constraints;
cleanse the formatted data and constraints to generate cleansed and formatted data and constraints;
apply one or more models to the cleansed and formatted data and constraints in order to identify relationships among variables of the plurality of sets of data and constraints; and
generate the offer with the optimized parameters based on the relationships among the variables of the plurality of sets of data and constraints.

7. A non-transitory computer-readable medium storing instructions, the instructions comprising:
one or more instructions that, when executed by one or more processors of a first device, cause the one or more processors to:
receive, by the first device and from a first entity associated with the first device, first information;
receive, via a first blockchain node associated with the first device, and from a second entity associated with a second device, second information,
wherein the first entity and the second entity are associated with performing a transaction associated with a smart contract;
determine, via the first blockchain node, whether a plurality of information, including the first information and the second information, is associated with the smart contract,
the smart contract being associated with the second device that is different than the first device,
the second device including a second blockchain node,
the first device being associated with a first analytics engine,
the second device being associated with a second analytics engine, the second analytics engine being different from the first analytics engine, and
the first blockchain node and the second blockchain node being part of a blockchain network;
determine, via the first blockchain node and based on determining whether the plurality of information is associated with the smart contract, whether to provide the plurality of information to the first analytics engine or to process the plurality of information by the first blockchain node;
provide one or more portions of a plurality of computations associated with the smart contract to one or more third analytics engines associated with one or more third devices when the first analytics engine cannot perform the one or more portions of the plurality of computations,
the one or more third devices being provided in the blockchain network and being associated with the first device, and
the first analytics engine performing a particular portion of the one or more portions of the plurality of computations and the one or more third analytics engines performing one or more different portions of the plurality of computations;
perform, via the first analytics engine, a data analytics technique on the plurality of information;
generate an offer based on performing the data analytics technique on the plurality of information;
provide the offer to the smart contract;
receive, via the first blockchain node, an indication of acceptance of the offer based on providing the offer to the smart contract;
cause parameters associated with the offer to be implemented based on receiving the indication of acceptance of the offer; and
train, by one or more devices that include at least one of the first device or the second device, a model associated with the smart contract, with encrypted data stored on the one or more devices, the training comprising associating a reward with the smart contract based on the model being trained, and the reward being received by the one or more devices.

8. The non-transitory computer-readable medium of claim 7, where the one or more instructions, when executed by the one or more processors, further cause the one or more processors to:

receive, via the first blockchain node, system information from one or more systems of an entity associated with the first device,
the system information including parameters and constraints associated with the entity;

perform, via the first analytics engine, the data analytics technique on the system information and the plurality of information; and generate the offer based on performing the data analytics technique on the system information and the plurality of information.

9. The non-transitory computer-readable medium of claim 8, where the parameters associated with the entity include one or more of:

a parameter associated with a product produced by the entity,
a parameter associated with a quantity of the product produced by the entity in a time period,
a parameter associated with a material used by the entity to make the product,
a parameter associated a lead time for the product, or
a parameter associated with a bid price for the product.

10. The non-transitory computer-readable medium of claim 7, where the plurality of information associated with the smart contract includes one or more of:

information associated with an available capacity of an entity associated with the first device,
information associated with available materials of the entity,
information associated with a minimum lead time for a product, or
information associated with a minimum asking price for the product.

11. The non-transitory computer-readable medium of claim 7, where the first device receives, from the second device, an indication of completion of a transaction associated with the smart contract when the second device accepts the offer.

12. The non-transitory computer-readable medium of claim 7, where the one or more instructions, when executed by the one or more processors, further cause the one or more processors to:

organize the plurality of information associated with the smart contract into formatted information;
cleanse the formatted information to generate cleansed and formatted information;
apply one or more models to the cleansed and formatted information in order to identify relationships among variables of the plurality of information associated with the smart contract; and
generate the offer based on the relationships among the variables of the plurality of information associated with the smart contract.

13. The non-transitory computer-readable medium of claim 7, where the blockchain is managed by a peer-to-peer network of nodes that includes the blockchain node of the first device and a blockchain node of the second device.

14. A method, comprising:

receiving, by a first device and from a first entity associated with the first device, a first set of parameters;

receiving, via a blockchain node associated with the first device, and from a second entity associated with a second device, a second set of parameters,
the first entity and the second entity being associated with performing a transaction associated with a smart contract;

determining via the blockchain node, whether a plurality of sets of parameters, including the first set of parameters and the second set of parameters, are associated with the smart contract,
the smart contract being associated with the second device that is different than the first device,
the first device and the second device being provided in a blockchain network,
the first device being associated with a first analytics engine,
the second device being associated with another blockchain node and a second analytics engine,
the second analytics engine being different from the first analytics engine, and
the blockchain node and the other blockchain node being part of a plurality of blockchain nodes associated with the blockchain network;

determining, via the blockchain node and based on determining whether the plurality of sets of parameters are associated with the smart contract, whether to provide the plurality of sets of parameters to the first analytics engine or to process the plurality of sets of parameters by the blockchain node;

providing, by the first device, one or more portions of a plurality of computations associated with the smart contract to one or more third analytics engines associated with one or more third devices when the first analytics engine cannot perform the one or more portions of the plurality of computations,
the one or more third devices being provided in the blockchain network and being associated with the first device, and
the first analytics engine performing a particular portion of the one or more portions of the plurality of computations and the one or more third analytics engines performing one or more different portions of the plurality of computations;

performing, via the first analytics engine of the first device, a data analytics technique on the plurality of sets of parameters to generate an offer with optimized parameters with respect to an initial set of parameters;

providing, by the first device, the offer with the optimized parameters to the smart contract;

receiving, via the blockchain node of the first device, an indication of acceptance of the offer based on providing the offer with the optimized parameters to the smart contract;

causing, by the first device, the optimized parameters to be implemented based on receiving the indication of acceptance of the offer; and train, by one or more devices that include at least one of the first device or the second device, a model associated with the smart contract, with encrypted data stored on the one or more devices,
the training comprising associating a reward with the smart contract based on the model being trained, and
the reward being received by the one or more devices.

15. The method of claim 14, further comprising:
receiving, via the blockchain node of the first device, system information from one or more systems of an entity associated with the first device,
the system information including parameters and constraints associated with the entity; and
performing, via the first analytics engine of the first device, the data analytics technique on the system information and the plurality of sets of parameters to generate the offer with the optimized parameters.

16. The method of claim 15, where the plurality of sets of parameters associated with the entity include one or more of:
a parameter associated with a product produced by the entity,
a parameter associated with a quantity of the product produced by the entity in a time period,
a parameter associated with a material used by the entity to make the product,
a parameter associated a lead time for the product, or
a parameter associated with a bid price for the product.

17. The method of claim 14, where the plurality of sets of parameters associated with the smart contract include one or more of:
a parameter associated with an available capacity of an entity associated with the first device,
a parameter associated with available materials of the entity,
a parameter associated a minimum lead time for a product, or
a parameter associated with a minimum asking price for the product.

18. The method of claim 14, where the first device receives, from the second device, an indication of completion of a transaction associated with the smart contract when the second device accepts the offer.

19. The method of claim 14, further comprising:
organizing the plurality of sets of parameters into formatted parameters;
cleansing the formatted parameters to generate cleansed and formatted parameters;
applying one or more models to the cleansed and formatted parameters in order to identify relationships among variables of the plurality of sets of parameters; and
generating the offer with the optimized parameters based on the relationships among the variables of the plurality of sets of parameters.

20. The first device of claim 1, wherein a result of performing each of the one or more portions of the plurality of computations is posted to the smart contract.

* * * * *